US012211359B2

(12) United States Patent
Rintz et al.

(10) Patent No.: US 12,211,359 B2
(45) **Date of Patent: *Jan. 28, 2025**

(54) INSTANT VIDEO ALERT NOTIFIER

(71) Applicant: IPVIDEO CORPORATION, Bay Shore, NY (US)

(72) Inventors: William J Rintz, Hackettstown, FL (US); Terri-Ann K. Adrian, Westport, CT (US)

(73) Assignee: IPVIDEO CORPORATION, Bay Shore, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/534,665

(22) Filed: Dec. 10, 2023

(65) Prior Publication Data

US 2024/0177584 A1 May 30, 2024

Related U.S. Application Data

(63) Continuation of application No. 18/211,138, filed on Jun. 16, 2023, now abandoned, which is a continuation of application No. 18/112,348, filed on Feb. 21, 2023, now abandoned, which is a continuation of application No. 18/076,086, filed on (Continued)

(51) Int. Cl.
*G08B 13/196* (2006.01)
*G08B 25/10* (2006.01)

(52) U.S. Cl.
CPC . *G08B 13/19673* (2013.01); *G08B 13/19632* (2013.01); *G08B 13/1966* (2013.01); *G08B 25/10* (2013.01)

(58) Field of Classification Search
CPC ....... G06F 13/385; G06F 1/1632; G05B 9/03; G08B 19/005; G08B 29/14; H04W 88/06; H04L 12/2803
See application file for complete search history.

(56) References Cited

U.S. PATENT DOCUMENTS

| | | | | |
|---|---|---|---|---|
| 2002/0050807 A1* | 5/2002 | Janik | ..................... | H02J 7/0044 320/137 |
| 2008/0001734 A1* | 1/2008 | Stilp | .................... | G08B 25/009 340/539.22 |

(Continued)

*Primary Examiner* — Mirza F Alam

(57) ABSTRACT

A portable programmable display and control module which serves as a basic light switch and a digital custom light switch display. The control module can be removed from the electrical box when power fails to provide for an emergency flashlight. The control module can be provided with a mini-hard drive and microprocessor in order to be able to download digital content and display it on a lighted touch screen. The control module can also be controlled and programmed wirelessly by a computer or smart phone to control light switches, outlets, and other devices. The control module can also include a built-in solar cell to charge the module for prolonged power failures. A battery back-up can also be provided. The module can be provided with a front camera and a rear camera and can be used in emergency events to transmit images and video to first responders. The module can also be provided with two-way radio technology to allow communication with a first responder, in one non-limiting example, during an emergency event.

18 Claims, 3 Drawing Sheets

FRONT, REAR AND SIDE VIEWS

Related U.S. Application Data

Dec. 6, 2022, now abandoned, which is a continuation of application No. 17/149,555, filed on Jan. 14, 2021, now Pat. No. 11,521,472.

(60) Provisional application No. 63/114,942, filed on Nov. 17, 2020, provisional application No. 62/961,949, filed on Jan. 16, 2020.

(56) References Cited

U.S. PATENT DOCUMENTS

| | | | | |
|---|---|---|---|---|
| 2016/0224064 | A1* | 8/2016 | Fleisig | G06F 1/1632 |
| 2018/0103206 | A1* | 4/2018 | Olson | H04N 5/23258 |
| 2019/0253670 | A1* | 8/2019 | Chien | F21S 4/28 |

* cited by examiner

INSTANT VIDEO ALERT NOTIFIER

This application is a continuation of U.S. application Ser. No. 18/211,138, filed Jun. 16, 2023, which is a continuation of U.S. application Ser. No. 18/112,348, filed Feb. 21, 2023, which is a continuation of U.S. application Ser. No. 18/076,086, filed Dec. 6, 2022, which is a continuation of U.S. application Ser. No. 17/149,555, filed Jan. 14, 2021, now U.S. Pat. No. 11,521,472, which claims the benefit of and priority to U.S. Provisional Patent Application Ser. No. 63/114,942, filed Nov. 17, 2020 and U.S. Provisional Patent Application Ser. No. 62/961,949, filed Jan. 16, 2020. All of the above applications are incorporated by reference in their entireties for all purposes.

1. FIELD OF THE DISCLOSURE

The disclosure relates generally to the field of light switches and the field of alerts.

2. BACKGROUND

There are currently light switches on the market that have increased functionality as compared to traditional light switches that merely turned a light on and off. Additionally, all light switches are rendered useless when there is a power failure. The present disclosure describes a novel light switch which provides further functionality as compared to current lights switches and also is operable during a power failure. Also, disclosed is a novel alert system.

SUMMARY OF THE DISCLOSURE

The present disclosure describes a custom light switches which expands on the functionality provided at the light switch, though, inter alia, the introduction, of a custom display and wireless remote control while also preferably incorporating certain functions of current light switches.

In a preferred embodiment a portable programmable display and control module is disclosed which can serve as a basic light switch and a digital custom light switch display. The control module can be removed from the electrical box (i.e. an electrical box disposed within an internal wall of a house, building, etc.) when power fails to provide for an emergency flashlight and can transmit coordinates for first responders to use for locating an individual during an emergency (i.e. hurricane, earthquake, terrorists event, school shooting, etc.). The control module can be provided with a mini-hard drive and microprocessor in order to be able to download digital content and display it on a lighted touch screen. The control module can also be provided with numerous solid state sensors to detect-heat, motion, carbon monoxide etc. The control module can also be controlled and programmed wirelessly by a computer or smart phone to control light switches, outlets, and other devices. The control module can also include a built-in solar cell to charge the module for prolonged power failures. While electrically secured within an electrical box, the module can be charged by the electrical system of the building/house, etc., such that when there is a power failure or other event resulting in the module being removed from the electrical box, the module can be fully charged.

The control module can also be provided with an internal battery back-up system which allows for continued and enhanced use once conventional power is lost. In one non-limiting embodiment, the internal battery back-up can provide power for one or more or a plurality (e.g. 2, 3, etc.) super brite LEDs to illuminate and also provide power to Z WAVE chips to permit for continue functioning.

In addition to Bluetooth or WiFi, other current and/or later developed wireless protocols can be used for communication with the control module to provide for additional functionality or other remote location, such as, without limitation, a command or operations center for a local first responders agency or department (i.e. police, FBI, fire department, etc.) The control module can also preferably sync to a smart phone and control lights within a designated or specific range in applications, such as, but not limited to, hotels.

For a further detailed explanation of embodiments and operation for the above-referenced emergency flashlight, transmitting coordinates for first responders, solar cell and certain other features of the portable programmable display and control module and other features for a custom light switch, the Applicant incorporates by reference in their entireties as if fully set forth herein, the entire disclosures of his previous filed U.S. patent applications, including, but not limited to, U.S. application Ser. No. 11/931,204 filed Oct. 31, 2007, U.S. application Ser. No. 11/858,580 filed Sep. 20, 2007, U.S. application Ser. No. 11/369,207 filed Mar. 6, 2006 now U.S. Pat. No. 7,273,983, U.S. application Ser. No. 10/912,746 filed Aug. 5, 2004 now U.S. Pat. No. 7,009,111, U.S. application Ser. No. 10/643,230 filed Aug. 18, 2003, U.S. application Ser. No. 10/094,746 filed Mar. 11, 2002 U.S. Pat. No. 6,608,253, U.S. application Ser. No. 09/550,532 filed Apr. 17, 2000 now U.S. Pat. No. 6,355,855, U.S. application Ser. No. 09/009,710 filed on Jan. 20, 1998 now U.S. Pat. No. 6,051,787, U.S. application Ser. No. 08/826,643 filed on Apr. 4, 1997 now U.S. Pat. No. 5,874,693, U.S. application Ser. No. 08/769,623 filed on Dec. 18, 1996 now U.S. Pat. No. 5,811,730, U.S. application Ser. No. 08/640,538 filed on May 2, 1996 now U.S. Pat. No. 5,811,729.

DETAILED DESCRIPTION

Figure 3:
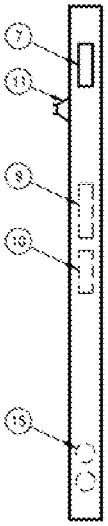
FIG. 3 is a side of the control module of FIG. 1.
Figure 1:
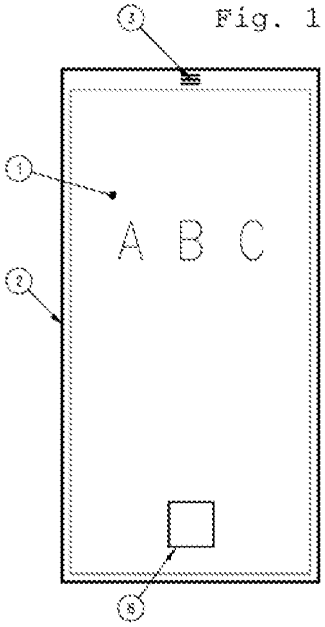
FIG. 1 is a plan view of the preferred control module for the disclosed novel portable programmable display and control module/device in accordance with the present disclosure.
Figure 2:
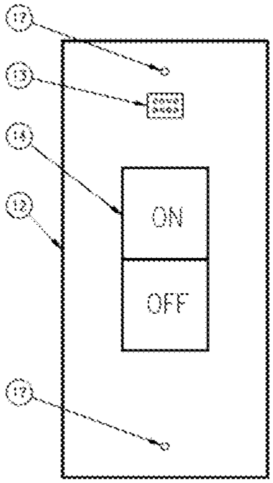
FIG. 2 is a plan view of the preferred mounting bracket for the disclosed novel portable programmable display and control module.
Figure 4:
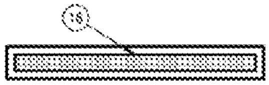
FIG. 4 is a top view of the control module of FIG. 1.
Figure 5:
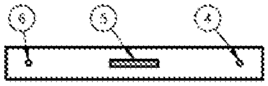
FIG. 5 is a bottom view of the control module of FIG. 1.

The figures illustrate a first non-limiting embodiment for the portable programmable display and control module. Reference numeral 1 represents a lighted touch screen. The outer perimeter for a custom frame is noted as reference numeral 2. Reference number 3 represents a built-in audio speaker. Thus, with speaker 3 built in, digital music can be sent from an electronic device (cell phone, mp3 player, computer, satellite, laptop, etc.) to the control module and heard through speaker 3 by the occupant(s) of the room. This provides additional usefulness of areas of the room conventionally only used as for a light switch. Reference number 4 can be a plug in (port) (such as, but not limited to, a ¼" plug in or USB port) for downloading or exporting digital content 5. Digital content can also be received or sent out by various types of wireless technologies, including, but not limited to, a Bluetooth or WiFi connection. Reference number 6 can represent a USB port or other port. An A/C plug in 7 can be provided for portable charging. A volume control 8 can also be provided.

The control module is preferably synced up to an electronic device such as, but not limited to, smart phone, computer, laptop, tablet, etc. Once the control module is synced it provides or allows for the exchange of data between the electronic device and control module. As an alternative to a direct synch up through a port/input on the control module, the electronic device and control module can be in communication through the internet wirelessly using UHF radio waves or other wireless technology. Furthermore, communication and the transfer of digital data can also be made via a wired connection such as Ethernet, USB port, ¼ phone jack preferably on the bottom of the control module (in one non-limiting embodiment) or other wired technology.

The lighted touch screen can be of various types such as, but not limited to, TFT LCD (thin film transistor) IPS-LCD, capacitive touch screen LCD, AMOLED, Retina display, Haptic/tactile touch screen, Gorilla glass or other light/display technology.

A main unlock button on the touch screen can be represented by reference number 9. The figures also show a mini hard drive 10, a microprocessor 11, a mounting bracket plug in 12, an electrical mounting bracket 13 and a plug in port 14 for the display module. A manual on/off button 15 for the light switch can be provided for use when the module is removed (i.e. emergency flashlight, etc.). A built-in battery backup system 16 can also be provided for lighting the LEDs and for the above-mentioned location technology. The above referenced built-in solar cell can be provided for charging the display/control module during periods of prolonged power failures or non or limited access to a power source.

The module can be provided with internal memory and/or have a slot for external memory (i.e. sim disk). Amongst other things, the memory can be used for storing images, music, videos, etc. such that once downloaded into memory the images, music, videos can be displayed/played from memory without requiring further communication from a electronic device such as a cell phone, computer, notebook, tablet, laptop, etc. and the images, video, etc. can also be transmitted to a remote location (i.e. video or images sent to a command center during an emergency event, etc.).

Figures 6A, 6B, 6C, 6D, 6E, 6F, 6G:
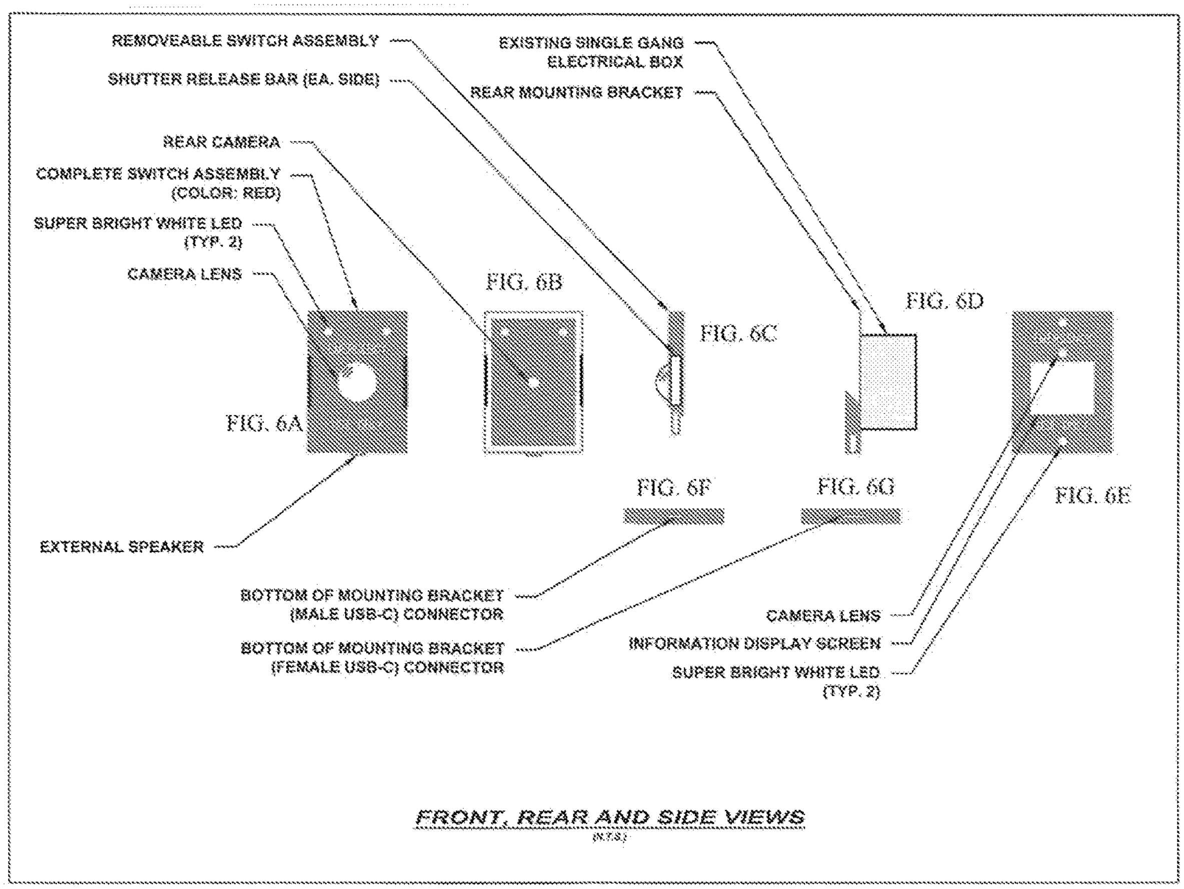
FIG. 6A illustrates a front view of the module/device in accordance with the present disclosure.
FIG. 6B illustrates a back view of the module/device in accordance with the present disclosure.
FIG. 6C illustrates a side view of the module/device in accordance with the present disclosure.
FIG. 6D illustrates a side view of the rear mounting bracket and electrical box in accordance with the present disclosure.
FIG. 6E illustrates a front view of another embodiment for the module/device in accordance with the present disclosure.
FIG. 6F illustrates a bottom view of a first embodiment for the mounting bracket in accordance with the present disclosure.
FIG. 6G illustrates a bottom view of a second embodiment for the mounting bracket in accordance with the present disclosure.

FIG. 6 shows another non-limiting embodiment for the disclosed device. The programmable display and control module/device can comprise various wireless protocol options with reconfigurable menu driven design. In one non-limiting embodiment, the functions can be accomplished through a tablet-like restricted WiFi software configuration and smart display. The programmable display and control module/device can also be a modified tablet-type device with a universal USB-C connector (or other electrical connector/port) to mounting bracket.

One non-limiting feature variation of the disclosed novel portable programmable digital display and control module/device configuration including two cameras and two-way radio capabilities. The module/device can also be configured with an information display screen that first responders can text and verbally issue updates and information to the individual mobile devices through the speaker.

In any emergency situations, an individual can remove the device to sound an alarm (i.e. preferably automatically trigger an alarm). The device can capture (preferably automatically capture) an image of whomever removes the device preferably utilizing the Shutter Release Bars and 180 degree front camera in one non-limiting embodiment. The individual possessing the device can now have a mobile battery back-up camera, LED flashlight and location beacon. By pointing the device at any emergency situation or individual; the individual can capture a time and location stamped image, such as, without limitation, utilizing the Rear Camera and depressing the Shutter Release Bars located on the sides of the device. This image can be automatically uploaded to police and first responder tablets outside the building or structure. All remaining stationary devices (i.e. also located within the building) can be automatically switched to Video Broadcast Mode so that police and first responders can select individual device cameras to view real-time events inside the building or structure.

The microprocessor can be programmed to automatically send out images and/or video as they are digitally captured/streamed. The location(s) for receipt of the images and/or video can be preprogrammed and stored in a database or other memory.

Figure 7:
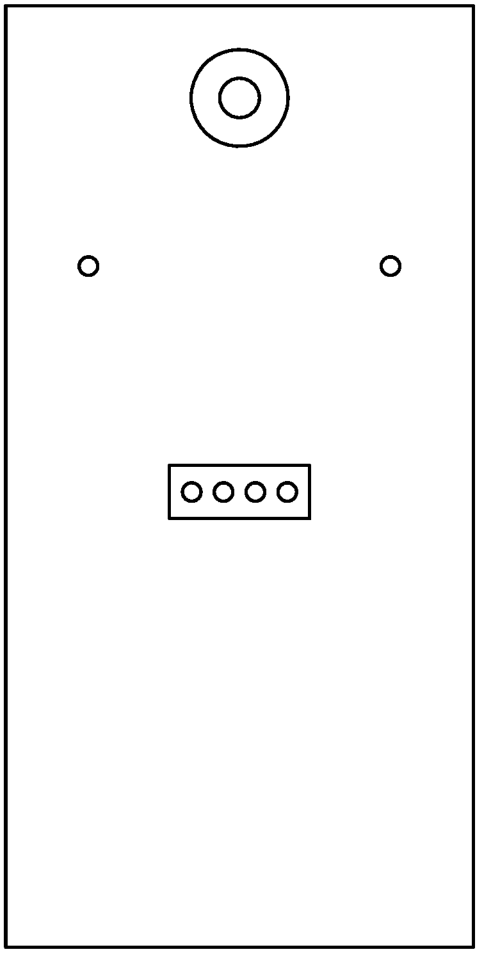
FIG. 7 is a back view of one embodiment for the control module.

FIG. 7 illustrates a back view for another non-limiting embodiment for the module.

All locations, sizes, shapes, measurements, amounts, angles, component or part locations, configurations, dimensions, values, materials, orientations, colors, wired or wireless communication technologies, powering sources, mechanical connections, digital data storages, electrical connector types, camera types, etc. discussed above or shown in the drawings are merely by way of example and are not considered limiting and other locations, sizes, shapes, measurements, amounts, angles, component or part locations, configurations, dimensions, values, materials, orientations, colors, wired or wireless communication technologies, powering sources, mechanical connections, digital data storages, electrical connector types, camera types, etc. can be chosen and used and all are considered within the scope of the invention.

Dimensions of certain parts as shown in the drawings may have been modified and/or exaggerated for the purpose of clarity of illustration and are not considered limiting.

In addition to microprocessor and mini-hard drive, other conventional computer and electrical components (i.e. RAM, ROM, memory, database, transmitters, receivers, circuitry, two-way radio technology, speakers, cameras, electrical communication technology, GPS technology, etc.) will also be provided and contained, preferably within the housing, as needed to accomplish the above described functions. Additionally, various electrical connections or wiring will be provided between the various components, microprocessors, mini-hard drive, sensors, lights, speaker, solar cell, battery back-ups, cameras, etc.

The shape of the control module housing is not considered limited to the shown rectangular shape and can be any particular shape, including novel eye pleasing shapes to increase the aesthetics of the control module housing.

The applicant also incorporates by reference in their entireties for all purposes the following U.S. patent applications and any patents resulting therefrom, as if fully set forth herein:

1. U.S. application Ser. No. 16/292,252, filed Mar. 4, 2010
2. U.S. application Ser. No. 15/863,188, filed Jan. 5, 2018,
3. U.S. application Ser. No. 15/677,411, filed Aug. 15, 2017,
4. U.S. application Ser. No. 15/615,933, filed Jun. 7, 2017,
5. U.S. application Ser. No. 14/641,166, filed Mar. 6, 2015,
6. U.S. Provisional Patent Application Ser. No. 61/948,995, filed Mar. 6, 2014.

Various components, features, parts, etc. described for one embodiment for the disclosed device can also be used for another embodiment of the disclosed device.

All components of the present disclosed module and alert system and their attachment locations, materials, angular relationships, light types, bulb types, sizes, shapes, attachment mechanisms, electrical connections, electrical communications, electrical circuitry, electrical devices, power sources, light controllers, remote types, dimensions, values, etc. discussed above or shown in the drawings, if any, are merely by way of example and are not considered limiting and other component(s) and their attachment locations, materials, angular relationships, light types, bulb types, sizes, shapes, attachment mechanisms, electrical connections, electrical communications, electrical circuitry, electrical devices, power sources, light controllers, remote types, dimensions, values, etc. currently known and/or later developed can also be chosen and used and all are considered within the scope of the disclosure.

Unless feature(s), part(s), component(s), characteristic(s) or function(s) described in the specification or shown in the drawings for a claim element, claim step or claim term specifically appear in the claim with the claim element, claim step or claim term, then the inventor does not consider such feature(s), part(s), component(s), characteristic(s) or function(s) to be included for the claim element, claim step or claim term in the claim when and if the claim element, claim step or claim term is interpreted or construed, whether during prosecution of this application or in litigation or similar proceeding. Similarly, with respect to any "means for" elements in the claims, the inventor considers such language to require only the minimal amount of features, components, steps, or parts from the specification to achieve the function of the "means for" language and not all of the features, components, steps or parts describe in the specification that are related or could be attributed to the function of the "means for" language.

While the disclosed module has been described and disclosed in certain terms and has disclosed certain embodiments or modifications, persons skilled in the art who have acquainted themselves with the disclosure, will appreciate that it is not necessarily limited by such terms, nor to the specific embodiments and modification disclosed herein. Thus, a wide variety of alternatives, suggested by the teachings herein, can be practiced without departing from the spirit of the disclosure, and rights to such alternatives are particularly reserved and considered within the scope of the disclosure.

What is claimed is:

1. A portable programmable display and control module, comprising:

a housing having an outer perimeter service as a frame, wherein the housing is removably secured at an electrical box to power a microprocessor;

a lighted touch screen disposed within the outer perimeter; and the microprocessor disposed within the housing, said lighted touch screen in communication with the microprocessor, wherein the microprocessor is configured to:

create, based on depression of one or more shutter release bars on the control module, a time and location stamp;

digitally associate the time and location step to a camera image of an emergency event comprising an attempt to remove the housing from the electrical box; and wirelessly transmit the camera image of the emergency event with the time and location stamp to a remote location.

2. The portable programmable display and control module of claim 1 further comprising mounting bracket for mounting the control module at the electrical box.

3. The portable programmable display and control module of claim 1 wherein the microprocessor can be synched with an external or non-connected electronic device to exchange data between the microprocessor and electronic device.

4. The portable programmable display and control module of claim 3 further comprising a speaker disposed within the housing and in communication with the microprocessor, wherein said microprocessor receives digital music from the electronic device which is heard through the speaker.

5. The portable programmable display and control module of claim 1 further comprising two-way radio electronics or circuitry disposed within the housing.

6. The portable programmable display and control module of claim 1 further comprising a first camera operating from a front area of the module and a second camera operating from a rear area of the module, the first camera and the second camera both in communication with the microprocessor.

7. The portable programmable display and control module of claim 1 further comprising a speaker housed or secured by the housing and in electrical communication with the microprocessor; wherein the microprocessor is programmed to receive audio messages from a remote location and to cause the received audio messages to be broadcasted through the speaker.

8. A method for updating remotely located individuals during an event, comprising:

a. removing a module secured to a power source in a building by an individual, the module having a front camera and a rear camera;

b. pointing the module an another individual or emergency event and capturing an image of the another individual or emergency event using either the front or rear camera;

c. depressing one or more shutter release bars disposed on the module for instructing a microprocessor for the module to create a time and location stamp;

d. digitally associating the time and location stamp to the image captured in step b.; and e. wirelessly transmitting the image with time and location stamp to a remote location to allow an individual at the remote location to receive a virtually real time image of the another individual or emergency event.

9. The method for contacting of claim 8 further comprising automatically triggering an alarm upon removing the module in step a.

10. The method for contacting of claim 8 further comprising automatically capturing an image of the individual using the front camera upon removal of the module in step a.

11. The method for contacting of claim 8 wherein the rear camera is used to capture the image in step b.

12. The method for contacting of claim 8 further comprising:

f. providing one or more additional modules at different locations within the building; and g. upon removal of the module in step a., automatically causing all additional modules that have not also been removed to switch to a video capturing mode to capture or record video of geographical areas associated with the additional modules during a same time period.

13. The method for contacting of claim 12 further comprising automatically transmitting video captured or recorded to a remote location.

14. The method for contacting of claim 12 further comprising h. allowing communication between an electronic device associated with a law enforcement officer or first responder and the additional modules; and i. allowing the video captured or recorded to be displayed on a screen associated with the electronic to provide updates to the law enforcement officer or first responder for different geographical areas within the building.

15. The method for contacting of claim 12 further comprising h. automatically allowing communication between an electronic device associated with a law enforcement officer or first responder and the additional modules; and i. automatically allowing the video captured or recorded to be displayed on a screen associated with the electronic to provide updates to the law enforcement officer or first responder for different geographical areas within the building.

16. A method for updating remotely located individuals during an event, comprising:

a. removing a module secured to a power source in a building by an individual, the module having a front camera and a rear camera;

b. pointing the module an another individual or emergency event and capturing or recording video of the another individual or emergency event using either the front or rear camera;

c. depressing one or more shutter release bars disposed on the module for instructing a microprocessor for the module to create a time and location stamp;

d. digitally associating the time and location stamp to the video captured or recorded in step b.; and e. wirelessly transmitting the video with time and location stamp to a remote location to allow an individual at the remote location to receive virtually real time video of the another individual or emergency event.

17. The method for contacting of claim 16 further comprising automatically triggering an alarm upon removing the module in step a.

18. The method for contacting of claim 16 further comprising automatically capturing an image of the individual using the front camera upon removal of the module in step a.

* * * * *